(No Model.)
A. LEE.
EXPANDING AUGER.
No. 581,677. Patented Apr. 27, 1897.
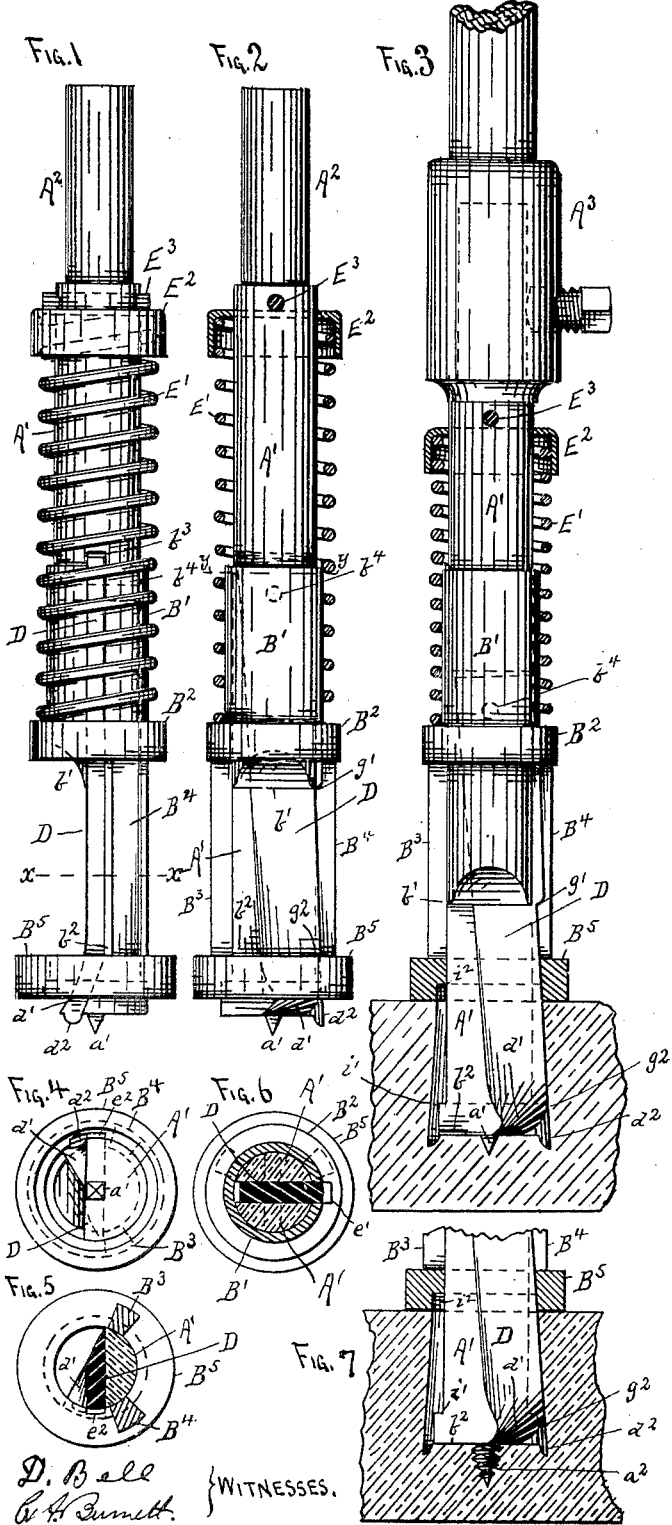
WITNESSES.
D. Bell
C. H. Burnett
Andrew Lee, INVENTOR.
By Charles N. Woodward
Atty.

UNITED STATES PATENT OFFICE.

ANDREW LEE, OF ST. PAUL, MINNESOTA.

EXPANDING AUGER.

SPECIFICATION forming part of Letters Patent No. 581,677, dated April 27, 1897.

Application filed March 18, 1896. Serial No. 583,795. (No model.)

*To all whom it may concern:*

Be it known that I, ANDREW LEE, a subject of the King of Sweden and Norway, (but having declared my intention of becoming a citizen of the United States,) residing at St. Paul, in the county of Ramsey and State of Minnesota, have made certain new and useful Improvements in Expanding Augers, of which the following is a specification.

This invention relates to augers which are automatically expandible to form a hole of gradually-increasing size as the boring proceeds; and it consists in the construction, combination, and arrangement of parts, as hereinafter shown and described, and specifically pointed out in the claims.

In the drawings, Figure 1 is a side view, and Fig. 2 is a front view, of one of the augers complete with the cutting-bit withdrawn into the "head" or "socket;" and Fig. 3 is a front view showing the auger in operation in the wood. Fig. 4 is a bottom plan view. Fig. 5 is a cross-section on the line $x$ $x$ of Fig. 1, looking downward. Fig. 6 is cross-section on the line $y$ $y$ of Fig. 2, looking downward. Fig. 7 is a sectional detail illustrating the construction when the auger is to be employed in a hand-brace.

A' is the main shank or "stock," having the head $A^2$, by which it may be secured in a mandrel $A^3$ of a boring-machine or in a bit-brace, and is provided on its lower end with a center point $a'$ when used in a boring-machine or with a draw-screw $a^2$ when employed in a hand-brace.

The stock A' fits closely in a sleeve B', having a collar $B^2$ on its lower end, the latter connected by standards $B^3$ $B^4$ to another collar $B^5$, which forms the lower guide for the auger and rests upon the lumber to be bored.

The stock A' is preferably circular in shape where it passes through the sleeve B' and collar $B^2$ and half-circular where it passes through the collar $B^5$, the lower portion being cut away on one side from $b'$ to $b^2$ to form a flat surface on which the bit-plate D will vibrate, the upper end of the bit-plate projecting upward into a cavity $b^3$, formed for it in the stock A', as shown in Figs. 1 and 6, and in which it is pivoted at $b^4$.

The lower end of the bit-plate D is curved outward somewhat, and is formed with the cutting edge $d'$ and a small guide-lip $d^2$ on its outer edge, as shown.

The lip $d^2$ is inclined on its inner side, as shown in Figs. 2 and 3, so that as the auger is revolved and forced downward and cuts its way into the wood the inclined side of the guide-lip, running around in the wood, forces the plate D to one side outward, away from the center of the stock, and thus cuts a hole which gradually and uniformly enlarges as it cuts its way downward, as shown in Fig. 3, and thus automatically forms an expanded or "dovetail-shaped" hole.

In the inner edges of the collars $B^2$ $B^5$ and of the sleeve B' cavities or recesses $e'$ $e^2$ are formed, into which the plate D fits, so that the rings and sleeve will be revolved with the stock.

The outer edge of the plate D from $g'$ to $g^2$ will be inclined, as shown in Figs. 2 and 3, and the degree of this inclination, together with the depths of the cavities $e'$ $e^2$, is what determines the extent of the expansion of the hole bored.

Ordinarily only a slight expansion is required, but the extent of the expansion may be increased or decreased to any required extent by simply increasing or decreasing the depths of the cavities $e'$ $e^2$ or the inclined side $g'$ $g^2$.

E' is a coiled spring surrounding the stock A' and sleeve B', and resting by its lower end upon the collar $B^2$, and secured in place at the top by a cap $E^2$ and pin $E^3$, and serving to keep the stock and its cutting-bit normally withdrawn, as shown in Figs. 1 and 2.

One peculiarity of the work of this auger is that the hole may be bored straight or without being expanded for a distance equal to the projection of the lower end of the plate D and its cutter $d'$, below the base-ring $B^5$, as the cutter-plate will not move laterally so long as all the parts move downward together. When, however, the ring $B^5$ comes in contact with the surface of the wood, its further progress is stopped and, the shank or stock continuing to move downward, the inclined portion from $g'$ $g^2$ permits of the lateral movement of the plate D by the action of the inclined guide-lip $d^2$, as before stated. The form of the hole may be thus readily varied to any desired extent by slight changes in the form of the outer edge of the plate D, as will be readily understood. After the hole is complete the plate D will freely withdraw itself toward the center of the stock, leaving the latter free to be drawn upward out of the hole.

The auger may be used in a hand-brace, but will preferably be operated by a power boring-machine. When used in a hand-brace, as before stated, the point $a'$ will be in the form of a draw-screw, as shown at $a^2$ in Fig. 7.

The augers may be made to form holes of any size or with any required angularity of sides.

The stock $A'$ is formed with a shoulder $i'$ to rest against a cavity $i^2$ in the lower surface of the ring $B^5$, to form a stop to limit the upward movement of the stock.

Having thus described my invention, what I claim as new is—

1. In an expanding auger, a sleeve having an annular flange on its lower end and a ring-plate connected to said sleeve and its flange by side bars, a stock having a circular upper portion slidable within said sleeve as a guide, and with its lower portion cut away to provide a transverse surface, a bit-plate pivoted by its upper end in said stock and supported upon said flattened surface and with its lower end provided with a horizontal cutting edge $d'$ and inclined scoring-lip $d^2$, and a spring surrounding said sleeve and supported at its upper end from said stock, and resting by its lower end upon the flange upon said sleeve, substantially as set forth.

2. In an expanding auger, a sleeve having an annular flange on its lower end and a ring-plate connected to said sleeve and its flange by side bars, and with a cavity in its lower side, a stock having a circular portion slidable within said sleeve as a guide, and with its lower portion cut away to provide a transverse surface and with a shoulder on its lower end adapted to rest within the cavity in said ring-plate, a bit-plate pivoted by its upper end in said stock and supported upon said flattened surface, and with its lower end provided with a horizontal cutting edge $d'$ and inclined scoring-lip $d^2$, and a spring surrounding said sleeve and supported at its upper end from said stock and resting by its lower end upon the flange upon said sleeve, substantially as and for the purpose set forth.

In testimony whereof I have hereunto set my hand in the presence of two subscribing witnesses.

ANDREW LEE.

In presence of—
J. E. ADAMS,
C. N. WOODWARD.